United States Patent [19]
Masuda

[11] 3,874,172
[45] Apr. 1, 1975

[54] FLUID PRESSURE REGULATOR VALVE AND SAFETY VALVE ASSEMBLY

[75] Inventor: Naosuke Masuda, Higashi-Matsuyamashi, Japan

[73] Assignee: Jidosha Kiki Kabushiki Kaisha, Tokyo, Japan

[22] Filed: June 14, 1973

[21] Appl. No.: 370,187

[30] Foreign Application Priority Data
June 14, 1972 Japan............................. 47-059219

[52] U.S. Cl..................... 60/403, 60/405, 60/416, 60/418
[51] Int. Cl........................ F15b 20/00, F15b 1/02
[58] Field of Search ............. 60/403, 405, 416, 418

[56] References Cited
UNITED STATES PATENTS

| | | | |
|---|---|---|---|
| 2,396,984 | 3/1946 | Broadston et al.............. | 60/416 X |
| 2,478,210 | 8/1949 | Sprague et al................... | 60/403 X |
| 2,544,997 | 3/1951 | Keim et al. ..................... | 60/405 X |

Primary Examiner—Edgar W. Geoghegan
Attorney, Agent, or Firm—Sughrue, Rothwell, Mion, Zinn and Macpeak

[57] ABSTRACT

A fluid pressure regulator assembly for pressure accumulators used in a dual pressure hydraulic brake system for vehicles. The regulator valve assembly is connected between an engine driven hydraulic pump and the accumulators to regulate the maximum pressure stored in the accumulators. The regulator valve assembly also includes an emergency shut-off valve and a one-way check valve for ech separate hydraulic braking circuit and is responsive to a pressure difference between the two accumulators caused by a pressure drop due to the damage in one of the braking circuits to actuate the shut-off valve in the damaged circuit for preventing loss of hydraulic fluid from the braking system. The shut-off valves and one-way check valves allow the remaining operational brake circuit to operate at full capacity without interruption.

7 Claims, 1 Drawing Figure

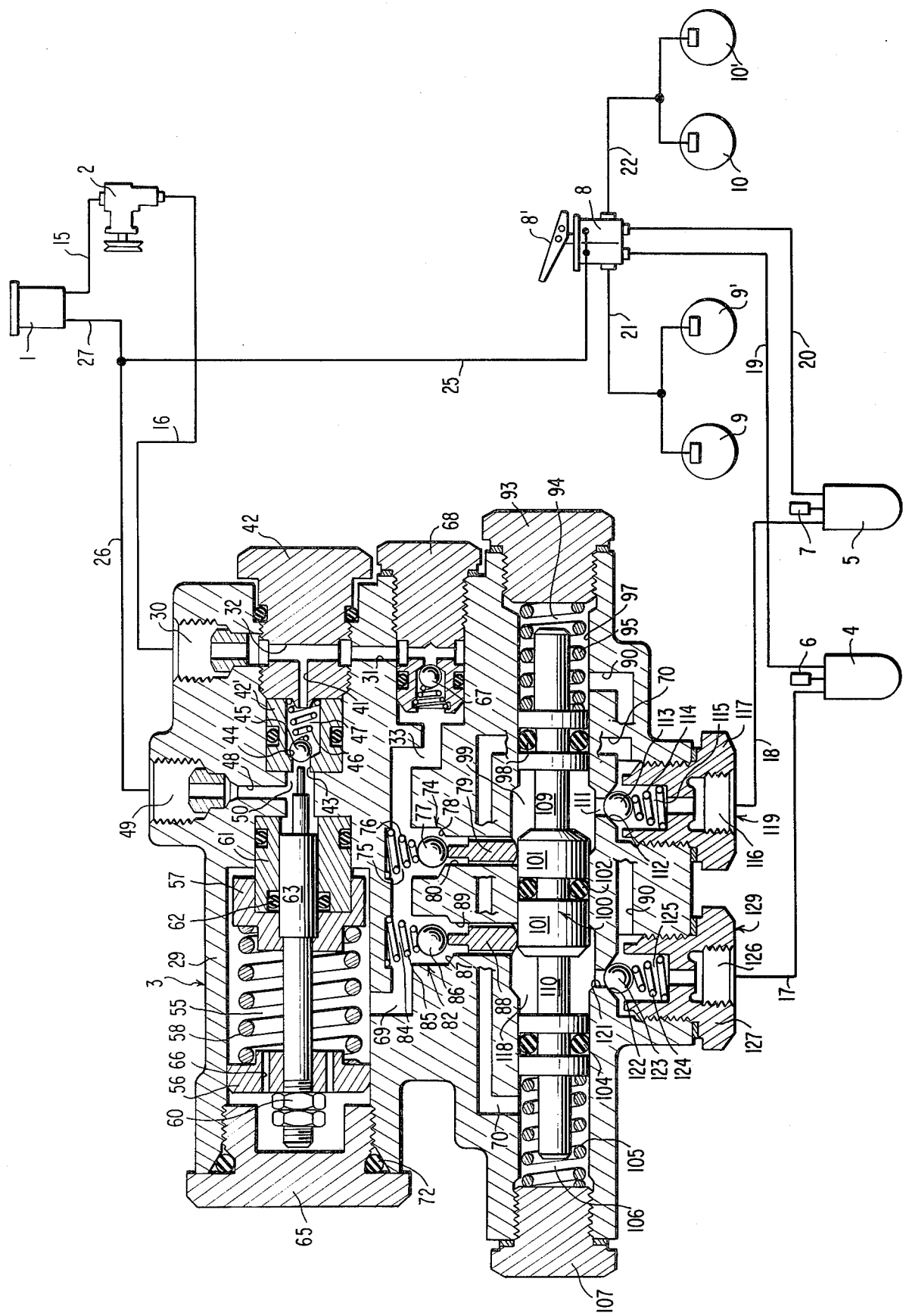

3,874,172

FLUID PRESSURE REGULATOR VALVE AND SAFETY VALVE ASSEMBLY

BACKGROUND OF THE INVENTION

1. Field of the Invention

This invention relates to a fluid pressure regulator valve assembly, and more particularly to a regulator valve assembly for pressure accumulators used in a dual full power hydraulic brake system for vehicles.

2. Description of the Prior Art

In full power hydraulic brack systems, the hydraulic pressure supplied from an engine driven pump is generally accumulated in a pressure accumulator so that any application of a brake pedal connected to a brake control valve will cause introduction of pressurized fluid to the wheel cylinders for stopping the rotation of the wheels. Accordingly, it is neessary that an amount of fluid pressure sufficient to provide the desired braking action but insufficient to cause impairment of durability of the brake system is accumulated and retained in the accumulators at all times.

In the conventional hydraulic brake systems having a single braking fluid conduit, however, a mechanical failure at any point necessarily causes escape of the braking fluid, thus resulting in complete loss of control of the brake system.

SUMMARY OF THE INVENTION

The present invention is intended to provide an improved pressure regulator valve assembly to be used in a dual full power hydraulic brake system which is actuated reliably and safely through two independent braking fluid conduits branching from a common supply passage connected to a source of pressurized fluid, so that mechanical failure in either brake conduit will not prevent the normal actuation of the other brake system.

The fluid pressure regulator valve assembly of this invention comprises a pressure regulated valve connected in said common supply passage each of said independent conduits being connected through an emergency valve to an accumulator, a check valve connected in each independent conduit and a slide valve common to both of said independent conduits and operatively connected to each of said emergency valves, said slide valve being operable to urge said emergency valves to their open position during normal operating condition, wherein fluid pressure from each of said accumulators is normally applied to a respective one of the opposite sides of said slide valve in order to retain the corresponding emergency valve in its open position, a loss of pressure within either of said accumulators causing movement of said slide valve in the direction to close the emergency valve connected to the accumulator having the loss in pressure.

According to this fluid pressure regulator valve assembly in the normally actuated state, the accumulation of the braking fluid is carried out simultaneously in both of said accumulators during the normal operating period until the pressure of the accumulated fluid reaches the desired level sufficient to actuate the braking system; then a stop valve is released to form a feed back circuit, to stop the accumulation of the braking fluid from the pump which is actuated to a no-lead condition and to close simultaneously the check valve for continuing the opening action of the releasing means; then, as the pressure of the accumulated braking fluid is reduced by the braking operations, the stop valve is returned to its initial position, thereby again starting the accumulation of the braking fluid by releasing the check valve; these operations are repeated.

If one of said braking systems is damaged, a difference between the fluid pressure in the damaged braking system and that in the normal braking system is detected by the slide valve and the circuit of the damaged braking system is closed to prevent the leakage of the braking fluid from the damaged system, and to assure the normal braking operation of the other braking system. As the leakage of the braking fluid is fully prevented, the sticking of the piston pump can be eliminated.

BRIEF EXPLANATION OF ACCOMPANYING DRAWING

The lone FIGURE is a diagram of a fluid circuit of a dual full power hydraulic brake system including a preferred embodiment of the pressure regulator valve assembly, shown in cross section, in accordance with this invention.

DESCRIPTION OF THE PREFERRED EMBODIMENT

Referring to the drawing, a fluid reservoir 1 is provided for supplying hydraulic fluid through a low pressure flexible hose 15 to an engine driven piston pump 2. The output from the piston pump 2 is conducted through a high pressure conduit 16 to a pressure regulator valve assembly 3. From the pressure regulator valve assembly 3, the high pressure fluid is distributed to a pair of independent accumulators 4 and 5 through conduits 17 and 18 connected to the branching outlets 126 and 116, respectively.

When the accumulator pressure has reached a predetermined maximum value, a pressure releasing means provided in the valve assembly 3 will be operated to allow the recirculation of hydraulic fluid from the conduit 16 through conduits 26 and 27 connected to discharge port 49 opening at the upper part of the pressure regulator valve assembly 3 to the reservoir 1.

Pressure outlet conduits 19 and 20 are provided between accumulators 4 and 5 and a brake control valve 8 for supplying the hydraulic fluid from the respective accumulators 4 and 5 to the brake control valve 8. Upon operation of a brake pedal 8' on the brake control valve 8, the pressurized hydraulic fluid is supplied through conduits 21 and 22 to the front wheel brake cylinders 9, 9' and the rear wheel brake cylinders 10, 10' respectively, of a running vehicle.

A return conduit 25 is connected between the discharge port of the control valve 8 and the conduit 27 which, as previously stated, is connected in turn to the reservoir 1 for the recovery of the used hydraulic fluid.

Pressure sensitive switches 6 and 7 are located in the accumulators 4 and 5, respectively, and are operable to energize an alarm device in response to a drop in pressure in either of the accumulators 4 or 5 below a predetermined value due to a mechanical fault or other adverse conditions.

The pressure regulator valve assembly 3 includes a valve housing 29 having an inlet port 30 located in the top of the housing and connected to the conduit 16 leading from the pressure pump 2. The inlet port 30 communicates with a penetrating hole 32 of a shut off plug 42 threaded into the valve housing 29 from one side thereof and a vertical passage 31. This vertical passage 31 is communicated further with a passage 33 extending laterally in the center zone of the housing 29 through a check valve 67 in a plug 68 which is threaded into the valve housing 29.

Emergency valves 74 and 82 are located at an intermediate point and at the terminus of the passage 33, respectively. Each valve 74 and 82 includes a valve element 77 and 86 positioned in a valve chamber 75 and 84, respectively, and urged against a valve seat 78 and 87 by a spring 76 and 85. The valve seats 78 and 87 are provided to surround apertures communicating with branch passages 80 and 89, respectively.

Each of the branching passages has a sliding rod 79 and 88 positioned therein. A longitudinal cut-off or slot is formed along the longitudinal length of each sliding rod 79 and 88.

A slide valve 100 is fitted slidably in a bore 97, formed through the lower portion of the valve housing 29 perpendicular to passages 80 and 89 for urging each of the emergency valves 74 and 82 to its open position during normal operating conditions. The slide valve 100 includes large diameter central portions 101 and small diameter portions 109 and 110.

The opposite sides of the central portions 101 of the slide valve 100 are normally maintained in contact with the lower ends of the sliding rods 79 and 88 so that each of the valve elements 77 and 86 is retained in its open position away from the corresponding valve seat 78 and 87 against the action of spring 76 and 85. In this embodiment, the small diameter portions 109 and 110 of the slide valve 100 are located such that valve chambers 99 and 118, which are defined between small diameter portions 109 and 110 and the bore 97, are in communication with the valve chambers 75 and 84 of the emergency valves 74 and 82 through the cut-outs or slots in the sliding rods 79 and 88. Seals 98, 102 and 104 are provided on each side of the chambers 99 and 118 to prevent leakage of fluid therefrom.

Plugs 93 and 107 are threaded into the opposite ends of the bore 97. Inlet chambers 94 and 106 are defined between the plugs 93, 107 and the slide valve 100. The inlet chambers 94 and 106 contain springs 95 and 105 extending between the inner ends of plugs 93 and 107 and the opposite ends of the slide valve 100 for locating and holding the slide valve 100 in the neutral position.

Check valve assemblies 119 and 129 are located in the valve housing 29 at the ends of passages 111 and 121. The passages 111 and 121 communicate with the valve chambers 99 and 118 in the bore 97.

The check valve 119 and 129 include plugs 117 and 127, which are threaded into valve chambers 115 and 125 in communication with the passages 111 and 121.

Valve elements 113 and 123 are movably retained in chambers 115 and 125, respectively, by plugs 117 and 127, and are biassed by springs 114 and 124 against valve seats 112 and 122 formed at the lower ends of the passages 111 and 121.

Each of the valve chambers 115 and 125 is communicated with inlet chambers 106 and 94 located at mutually opposite positions of the slide valve 100 via passages 70 and 90, respectively.

Outlet ports 116 and 126 are formed in the plugs 117 and 127 and are connected to the respective accumulators 5 and 4 through the conduits 18 and 17. In the illustrated embodiment of the present invention shown in the lone drawing, pressurized fluid delivered from the pump 2 to the inlet port 30 of the valve assembly 3 will pass through the passage 33, the emergency valves 74 and 82, the branching passages 80 and 89, and the valve chambers 99 and 118, will then open the check valves 113 and 123, and will be accumulated in the accumulators 5 and 4, respectively.

The resultant accumulated pressure will be applied to the inlet chambers 106 and 94 of the slide valve 100 via the passages 70 and 90, respectively.

The pressure regulation and recirculation circuit which may be completed and established when pressure accumulation in both the accumulators 4 and 5 has reached a maximum value will now be described.

An orifice 41 is formed axially in plug 42 and is connected with the penetrating hole 32 extending through the plug 42. The orifice 41 opens into a valve chamber 47 defined within a cylindrical member 42' fixedly secured to the inner end of the plug 42. Located in and opening through member 42' at the other end of the valve chamber 47 is an outlet port 43 for permitting a return flow of the pressurized fluid to the reservoir 1. The outlet port 43 contains a valve element 45 normally urged against a valve seat 44, formed on the inner wall of the port 43, by the action of a spring 46.

The outlet port 43 is connected to an internal passage 50 which, in turn, is connected by a longitudinal passage 48 through the discharge port 49 to the return conduits 26 and 27 leading to the reservoir 1 to form a recirculation circuit for excess fluid in conjunction with the orifice 41, the valve chamber 47, and the outlet port 43.

A large diameter cylindrical bore 55 is formed as an axial extension of the internal passage 50. A shut off plug 65 is fitted into an open end of the cylindrical bore 55 on the left side thereof in the FIGURE, and a sealing member 72 is interposed adjacent to the plug 65 for sealing the bore 55.

The large diameter cylindrical bore 55 sealed by the shut off plug 65 is communicated with the passage 33 via a passage 69 and the valve chamber 84 of the emergency valve 82, so that the supply pressure accumulated in each of the accumulators 4 and 5 by opening the check valve 67 is applied to the cylindrical bore 55.

Sealingly fitted to the inner end of the cylindrical bore 55 is an outer shell 61 which contains a releasing means 63 slidably fitted in an interior bore of the outer shell 61. The releasing means 63 has an inner end portion extending through the internal passage 50 and the outlet port 43 and abutting the valve element 45. An inner spring seat 57 is positioned over the releasing means 63 and tightly fitted onto the projection of the shell 61.

An outer spring seat 56 is mounted on the releasing means 63 near the outer end thereof, and a spring 58 is confined between the inner spring seat 57 and the outer spring seat 56. The inner end of the releasing means 63 is kept thrusted away from the valve element 45 by force of the spring 58 which is adjusted by an adjusting nut 60. An axial passage 66 is provided in the outer valve seat 56.

When the pressure within one accumulator 4, 5 has reached a predetermined maximum value, the internal pressure in the cylindrical bore 55 communicates with the supply passage 33 through the passage 69 and overcomes the opposing force of spring 58, thus causing the releasing means 63 to move toward the right, thereby moving the valve element 45 away from the valve seat 44 to complete the above-mentioned recirculation circuit between inlet port 30 and discharge port 49.

Meanwhile, the check valve 67 is closed by the pressure reduction in the passage 31.

Operation of a dual full power hydraulic brake system utilizing the pressure regulator valve assembly of the present invention will now be described. When the operation of the brake system is initiated, no pressure is accumulated in either of the accumulators 4 or 5. Accordingly, as no pressure is supplied from the accumulators 4 and 5 to the inlet chambers 94 and 106 of the slide valve assembly, the slide valve 100 is maintained in its neutral balanced position by the action of the springs 95 and 105, in the FIGURE, and the emergency valves 74 and 82 are held in their open positions by the sliding rods 79 and 88 resting on the opposite ends of the large diameter portion 101 of the slide valve 100.

The releasing means 63 is retained in a spaced position away from the valve element 45 by the action of the spring 58.

The valve element 45 is retained against the valve seat 44 so as to block the return passage leading to the discharge port 49 through the orifice 41 so that pressurized fluid delivered from the piston pump 2 passes through the conduit 16 and through the inlet port 30, the penetrating hole 32 and the vertical passage 31 of the regulator valve assembly 3.

The pressurized fluid proceeds through the cut-out passages of the sliding rods 79 and 88, the valve chambers 99 and 118, the passages 111 and 121, thereby forcing the check valve elements 113 and 123 to their open positions, and through the outlet ports 116 and 126, conduits 18 and 17 to the accumulators 5 and 4, respectively.

The pressure accumulated in a respective one of the accumulators 4 and 5 is communicated through the passages 70 and 90 to the inlet chambers 94 and 106. The supply pressure from the pump 2 is applied both against the accumulated pressure in the accumulators 4 and 5 and to the large diameter cylindrical bore 55 via the passage 69.

During normal operation of the hydraulic brake system, the pressure of the accumulators 4 and 5 will be equal and balanced and the slide valve 100 will continue to be maintained in its neutral position due to the equal pressures realized in the inlet chambers 94 and 106.

As the inner pressure of the large diameter cylindrical bore 55 is gradually increased, the releasing means 63 is forced to move rightwards but valve element 45 is not opened yet.

When the inner pressure of the large diameter cylindrical bore 55 is reached to the predetermined level by continuing the pressure accumulation, the releasing means 63 forces the valve element 45 to disengage from the valve seat 44 against the force of the spring 58, and accordingly a recirculation circuit will be formed which allows the pressurized fluid to pass from the pump 2 to the inlet port 30, the penetrating hole 32, the orifice 41, the valve chamber 47, the outlet port 43, the internal passage 50, the vertical passage 48, the discharge port 49, the return conduits 26 and 27, and to the reservoir 1. Meanwhile, the pump 2 is operated without load, and the fluid pressure in the vertical passage 31 becomes substantially zero. However, as the check valve 67 is closed, the internal pressures in the passage 33 at the downflow side, the emergency valves 74, 82, the valve chambers 99, 118 and the cylindrical bore 55 are kept at the maximum value. Besides, the pressure in the accumulators 4 and 5 is kept at the accumulated pressure by the check valve assemblies 119 and 129.

When the pedal 8' of the brake control valve 8 is depressed, some of the pressurized fluid within the accumulators 4 and 5 is released and is supplied through the conduits 21 and 22 to the respective front and rear brake cylinders 9 and 10 to provide a braking force in proportion to the pressure applied to the pedal. Upon release of the pedal, pressurized fluid is returned from the front and rear brake cylinders 9 and 10 through the discharge port of the brake control valve 8 and through the conduits 25 and 27 to the reservoir 1.

In this manner, the braking action can be repeatedly applied, as desired, until the pressure within the accumulators 4 and 5, hence, the pressure within the large diameter cylindrical bore 55 has decreased to a lower predetermined value, whereby the releasing means 63 is forced to move leftwards by the action of the spring 58, causing the valve element 45 to return to its initial seating position. When the valve element 45 has been seated against valve seat 44, the recirculation circuit through the orifice 41 is shut off and the pressurized fluid supplied from the pump 2 to the inlet port 30 is supplied to the accumulators 4 and 5 in the manner previously described hereinabove with reference to the FIGURE.

Repeated operations, including shut-down and restarting of the pressure accumulating operation, assure a properly functioning brake control capability which will proceed without interruption during the engine operating process.

The hydraulic pressure acting against the releasing means 63 to cause a seating or release of the valve element 45 against the valve seat 44 is obtained by pressure of whichever of the accumulators 4 or 5 has attained the predetermined pressure value earlier than the other.

If a mechanical failure should occur at any point in the front wheel brake system including the accumulator 4 and the brake cylinder 9, an abrupt decrease of pressure within the accmuulator 4 will cause an immediate and rapid pressure drop in the valve chamber 125, in the passage 90 and in the inlet chamber 94.

This results in destruction of the pressure balance on the slide valve 100, thereby causing the rightward movement of the slide valve 100. This movement causes the sliding rod 88 to be moved away from the left side of the large diameter section 101 of the slide valve 100 and drop onto the small diameter section 110.

As a result, the valve element 86 on the top end of the sliding rod 88 is caused to seat against the valve seat 87, thus closing the emergency valve 82. Accordingly, no pressurized fluid is supplied from the pump 2 to the accumulator 4, thus avoiding the leakage of any pressurized fluid through the broken part of the front wheel brake system, and the consequent reduction of the internal pressure in the cylindrical bore 55.

On the other hand, when the mechanical failure is caused in the rear braking system including the accumulator 5 and the brake cylinder 10 and the pressure in the accumulator 5 is rapidly reduced, the pressures in the valve chamber 115, the passage 70 and the inlet chamber 106 are duly reduced to move the slide valve 100 leftwards and to close the emergency valve 74. Thus, the pressure accumulation of the pressurized fluid from the pump to the accumulator 5 is stopped to prevent the leakage of the braking fluid from the damaged portions in the rear wheel braking system.

It should be pointed out that, although the two-dimensional structure shown in the drawing is used for convenience sake to explain the present invention, it does not make it clear how the slide valve 100 is returned to its normal position shown in the drawing after one of the sliding rods 79 and 88 has dropped onto the corresponding one of the small diameter portions 109 and 110. In actual practice, the emergency valves 74 and 82 are disposed perpendicularly to the drawing and include plugs for sealing the valve chambers 75 and 84 disposed thereabove. Once one of the sliding rods 79 and 88 has dropped onto the corresponding one of the small diameter portions 109 and 110, the sliding rod is drawn up and the slide valve 100 returned to its normal position by means of the springs 95 and 105 after repeated operation of the brake control valve 8 has equalized the accumulated pressure in the accumulators 4 and 5 with the pressure in the reservoir 1.

It will be seen that if either of the two braking systems becomes damaged and impossible to operate due to the reduction of the fluid pressure, a pressure difference is caused between the inlet chambers 94 and 106 of the slide valve 100, thus moving the slide valve 100 in either direction for closing the appropriate one of the emergency valves 74 and 82 and thereby keeping the normal pressure in the braking system. Accordingly, since the fluid pressure is kept at the normal pressure throughout the passage 33 due to the check valve 67 at the downflow side the pressure in passage 69 and the cylindrical bore 55, and the opening and closing motions of the valve element 45 by the releasing means 63 are always controlled by the fluid pressure in the cylindrical bore 55 to keep the fluid pressure in the braking system at the normal value and to ensure the normal braking motions, even if one of the braking systems is damaged.

The pressure difference between the inlet chambers 94 and 106 caused while the slide valve 100 is actuated either leftwards or rightwards can be determined to the desired value by selecting the elastic force of the springs 95 and 105. As previously described, when the pressure in the accumulators 4 and 5 is reduced below the predetermined value, the pressure sensitive switches 6 and 7 are actuated to signal that the running of the car is dangerous.

As particularly described above, the pressure regulating valve assembly of the present invention assures and maintains the braking capacity of the total dual braking system notwithstanding a mechanical fault in either of the two conduits of the system and also substantially eliminates the occurrence of braking fluid leakage therefrom.

While this invention has been described with reference to particular embodiments thereof, it will be understood that the numerous modifications may be made by those skilled in the art without actually departing from the scope of the invention.

Therefore the appended claims are intended to cover all such equivalent variations as coming within the true spirit and scope of the invention.

What is claimed is:

1. A fluid pressure regulator valve assembly for a dual pressure hydraulic brake system having two independent brakd fluid conduits branching from a common supply passage connected to a source of pressurized fluid, said valve assembly comprising a pressure regulated valve connected to said common supply passage, each of said independent conduits being connected through an emergency valve to an accumulator, a check valve provided in said common supply passage, a one way check valve connected in each independent conduit, a slide valve common to both of said independent conduits and operatively connected to each of said emergency valves, said slide valve being operable to urge said emergency valves to their open position during normal operating condition and a return passage in communication with said common supply passage at a point upstream of the dividing point of said two branching independent conduits, said return passage having a stop valve therein, said stop valve including a releasing means facing said stop valve and communicating with each of said accumulators, said releasing means being adapted to release and open said stop valve in response to a predetermined amount of pressure in either of said accumulators, wherein fluid pressure from each of said accumulators is normally applied to a respective one of the opposite sides of said slide valve through a respective one of fluid pressure introducing passages to retain the corresponding emergency valve in its open position and, when a loss of pressure is caused within either of said accumulators, said slide valve is moved in the direction to close the emergency valve connected to the accumulator having the loss in pressure, simultaneously fluid pressure from the other accumulator is applied to said releasing means, whereby a full pressure hydraulic braking operation is obtained utilizing the other accumulator maintained in normal operating condition.

2. A fluid pressure regulator valve assembly for a dual pressure hydraulic brake system comprising:
 1. a housing having
    a. an inlet port adapted to be connected to a source of hydraulic fluid,
    b. a first outlet port adapted to be connected to a hydraulic fluid reservoir,
    c. second and third outlet ports adapted to be connected to first and second independent hydraulic fluid accumulators, respectively
    d. a common supply passage located therein,
    e. a first conduit therein connecting said inlet port to said common supply passage,
    f. a second conduit therein connecting said common supply passage to said second outlet port,
    g. a third conduit therein connecting said common supply passage to said third outlet port, and
    h. a fourth conduit therein connecting said first conduit to said first outlet port;
 2. a first valve means located in said fourth conduit for blocking passage of hydraulic fluid therethrough when the fluid pressure in both said second and said third outlet ports is less than a first preselected value, but allowing passage of hydraulic fluid therethrough when the fluid pressure in either of said second and third outlet ports is greater than a second preselected value;
 3. a second valve means located in said first conduit for blocking passage of hydraulic fluid therethrough when the fluid pressure in either of said second and third outlet ports is greater than said first preselected value, but allowing passage of hydraulic fluid therethrough when the fluid pressure in both said second and said third outlet ports is less than said second preselected value;

4. a third valve means located in said second conduit for blocking passage of hydraulic fluid therethrough when the fluid pressure in said third outlet port substantially exceeds the fluid pressure in said second outlet port, but allowing passage of hydraulic fluid therethrough when the fluid pressure in said third outlet port is substantially equal to or less than the fluid pressure in said second outlet port; and 5. a fourth valve means located in said third conduit for blocking passage of hydraulic fluid therethrough when the fluid pressure in said second outlet port substantially exceeds the fluid pressure in said third outlet port, but allowing passage of hydraulic fluid therethrough when the fluid pressure in said second outlet port is substantially equal to or less than the fluid pressure in said third outlet port.

3. A valve assembly as claimed in claim 2 wherein said first valve means is designed so that said first and second preselected values are equal.

4. A valve assembly as claimed in claim 2 wherein the movement of said second valve means is responsive to the movement of said first valve means.

5. A valve assembly as claimed in claim 2 wherein said third valve means comprises:

1. a sliding piston having a head portion of one diameter and a tail portion of another diameter;

2. means for biasing said sliding piston in a first position when the fluid pressure in said outlet port is substantially equal to the fluid pressure in said third outlet port, but allowing said sliding piston to slide to a second position when the fluid pressure in said third outlet port substantially exceeds the fluid pressure in said second outlet port;

3. a sliding rod urged to abut against the head portion of said sliding piston in a direction perpendicular to its motion when said sliding piston is in its first position and to abut against the tail portion of said sliding piston in a direction perpendicular to its motion when said sliding piston is in its second position; and 4. a blocking element located in a flared portion of said second conduit and operatively connected to said sliding rod so that it is drawn into the narrower part of said flared portion, blocking said second conduit, when said sliding piston is in its second position, but is in the wider part of said flared portion, not blocking said second conduit, when said sliding piston is in its first position.

6. A valve assembly as claimed in claim 5 wherein said fourth valve means is the mirror image of said third valve means and the sliding piston in said third valve means is operatively connected to the sliding piston in said fourth valve means so that they move together.

7. A valve assembly as claimed in claim 2 wherein said first valve means is designed so that said first and second preselected values are different from each other.

* * * * *